Dec. 11, 1951 D. K. GANNETT 2,578,348
TELEVISION NOISE MEASURING TECHNIQUE AND APPARATUS
Filed July 19, 1949
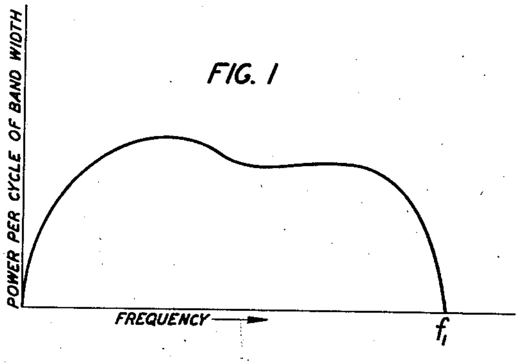
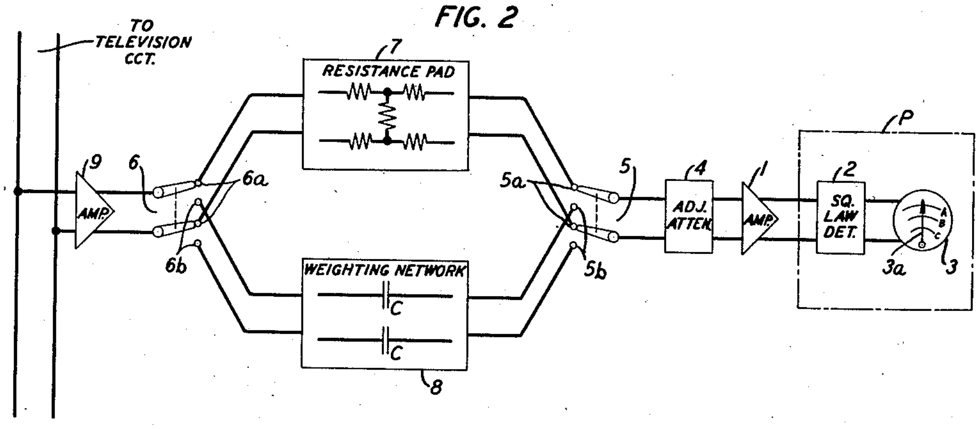
FIG. 3A
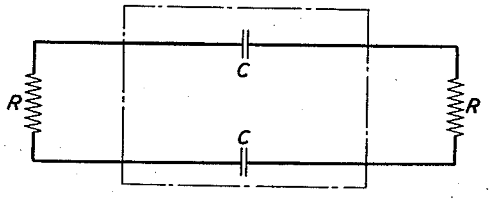
FIG. 3B
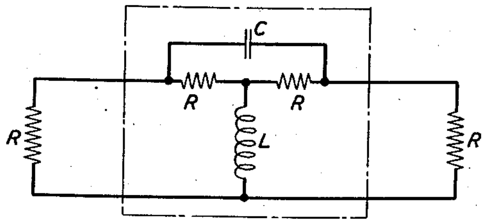
$\sqrt{\frac{L}{C}}=R$
INVENTOR
D. K. GANNETT
BY
N. D. Ewing
ATTORNEY Patented Dec. 11, 1951

2,578,348

UNITED STATES PATENT OFFICE 2,578,348

TELEVISION NOISE MEASURING TECHNIQUE AND APPARATUS

Danforth K. Gannett, Mountain Lakes, N. J., assignor to Bell Telephone Laboratories, Incorporated, New York, N. Y., a corporation of New York Application July 19, 1949, Serial No. 105,539

11 Claims. (Cl. 171—95)

The present invention relates to certain noise measuring techniques and apparatus applicable to television circuits. More particularly, it relates to the measurement of "noise" in television circuits, that is, to the measurement of the disturbing extraneous electrical effects present in the signal frequency band of a television circuit.

Heretofore, television noise measurements have been found to be poorly correlated with the actual disturbing effects which the noise produces on a television picture viewed at the receiver. This is particularly true when the noise varies in power over the frequency range of interest.

It is, therefore, a principal objec of this invention to provide improved techniques and apparatus for effectively measuring the visual effect of electrical signals in television circuits.

A more specific object of this invention is to evaluate the electrical noise responses in television circuits in terms of the effective interference which they produce in the projected television picture.

In accordance with the present invention, a measuring circuit has been devised which operates in conformity with a formula based on experimental data over considerable range of conditions, whereby the random noise of a test television circuit is weighted inversely as the radius of gyration of the noise distribution curve over the given frequency range.

One embodiment of the noise-measuring circuit of the present invention comprises the series combination of an amplifier, and a direct-current power meter, the latter having a plurality of scales, one of which is in units equal to ⅔ decibels, and another in units equal to ½ decibel. Switching means in the input circuit permits inserting either a distortionless attenuator or a differentiating circuit, having a uniform attenuation of 6 decibels per octave, ahead of the amplifier. The difference between the readings on the ⅔-decibel scale with a distortionless attenuator in the circuit, and the reading on the ½-decibel scale with a differentiating attenuator in the circuit, gives the effective noise weighted as described above.

In accordance with one feature of the invention, a good correlation is obtained between the measured values of effective noise and the actual interference observed in the received television picture.

Other features, objects and advantages of the present invention will be apparent from a detailed study of the specification and claims hereinafter with reference to the attached drawings in which:

Fig. 1 is a graphical representation of the noise frequency characteristic of a fictitious television circuit;

Fig. 2 is a schematic diagram of one embodiment of a measuring circuit in accordance with the present invention; and Figs. 3A and 3B are alternative forms of the differentiating circuit 8 of Fig. 2.

As used in the specification and claims hereinafter, the term "noise" as applied to video circuits refers to all of those extraneous electrical effects present in the television receiving circuit, in addition to signal current, whch appreciably distort the form of the received picture.

The efficacy of the circuit of the present invention as a noise measuring device for video circuits may be better understood from the following theoretical considerations. Assume that the actual random noise power is weighted so as to determine its effective interference to the television picture in accordance with a formula which states that the effective noise power is equal to the actual noise power divided by the effective frequency of the noise, which is defined as the frequency radius of gyration of the noise spectrum. Expressing the foregoing formula symbolically, $$N_e=\frac{N}{f_e} \qquad (1)$$

where $N_e$ is the effective noise power
N is the actual noise and
$f_e$ is the effective frequency of the noise.

Assume that the television circuit under test has a spectrum of random noise such as shown by Fig. 1 of the drawings, wherein the noise power is represented as $n$ microwatts per cycle of bandwidth. The noise spectrum may have any shape. The actual noise power is then equal to the area under the noise-frequency characteristic, or $$N=\int_0^{f_1} nd(f) \qquad (2)$$

where $f_1$ is the upper frequency limit of the band and N is a function of frequency.

The effective frequency of this noise is equal to the radius of gyration of this curve, or, $$f_e=\left[\frac{\int_0^{f_1} nf^2d(f)}{\int_0^{f_1} nd(f)}\right]^{\frac{1}{2}}=\sqrt{\frac{I}{N}} \qquad (3)$$

where I is the moment of inertia about the zero frequency axis, of the noise spectrum indicated in Fig. 1.

Then, substituting this value in Equation 1 above, the effective noise power is $$N_e=\frac{N}{f_e}=\frac{\left[\int_0^{f_1} nd(f)\right]^{3/2}}{\left[\int_0^{f_1} nf^2d(f)\right]^{1/2}}=\frac{N^{3/2}}{I^{3/2}} \qquad (4)$$

From Equation 4 the noise level in decibels is $$10 \log_{10} N_e=$$

$$10\left(3/2 \log_{10}\left[\int_0^{f_1} nd(f)\right]-1/2 \log_{10}\left[\int_0^{f_1} nf^2d(f)\right]\right) \qquad (5)$$

Equation 5 may be alternatively expressed as follows:

$$N_e(db)=\frac{3}{2}N(db)-\frac{1}{2}I(db) \qquad (6)$$

where $N_e(db)$ means $10 \log_{10} N_e$
$N(db)=10 \log_{10} N$ and
$I(db)=10 \log_{10} I$.

Details of one embodiment of a circuit in accordance with the present invention are shown in Fig. 2 of the drawings.

This comprises an amplifier circuit 1 which works into a power meter P comprising a conventional type square law detector 2, in series with a direct-current ammeter 3, the latter having a movable pointer 3 mounted thereon to move simultaneously over three parallel or concentric scales A, B and C marked on the face of the meter and having their zero marks centrally aligned. The middle scale A is calibrated in units equal to decibels with reference to some given power level, say, one microwatt; the upper scale B is calibrated in units equal to 3/2 decibels, and the lower scale C in units equal to ½ decibel. For convenience, the A scale may be extended to cover a range of 10 decibels on either side of the zero mark, the B and C scales having ranges which correspond thereto. It is apparent that the power meter P may comprise other conventional components than the square law detector 2 and the ammeter 3 shown.

An adjustable loss or gain calibrated in 10-decibel steps is preferably inserted in the circuit at some point ahead of the detector 2. This may take the form of the attenuator 4 connected between the input terminals of the amplifier 1 and double-throw, double-pole switch 5, having alternative sets of terminals 5*a* and 5*b*.

The television circuit under test is connected to the testing circuit through the amplifier 9, and the switch 6 having alternate upper and lower sets of terminals 6*a* and 6*b*.

Between the upper poles 6*a* of the switch 6 and the upper poles 5*a* of the switch 5 are respectively connected the input and output poles of a uniform fixed attenuation pad 7.

Similarly, to the lower poles 6*b* of the switch 6 and the lower poles 5*b* of the switch 5 are respectively connected the input and output terminals of the differentiating circuit 8.

The differentiating circuit 8 may be any well-known form of circuit which gives a loss that decreases at the rate of 6 decibels per frequency octave over the range of interest. Two possible forms are illustrated in Figs. 3A and 3B.

Fig. 3A consists simply of a condenser C in series with each side of the line. R represents the external impedances to which the circuit is connected, namely, the output impedance of amplifier 9 and the input impedance of adjustable attenuator 4. These impedances are assumed to be pure resistances.

Fig. 3B shows two resistances of value R in series with one side of the line. Across them is bridged condenser C, and from the junction between them to the other side of the line is connected inductance L. The values of L and C should have the relation, $$\frac{L}{C}=R^2$$

in which case the impedance of the circuit equals R at all frequencies.

For both embodiments, as shown in Figs. 3A and 3B, the insertion loss of the circuit corresponds to a power ratio of $$\frac{1}{1+\frac{f_c^2}{f^2}}$$

where $f_c=\frac{1}{2\pi RC}$ = the frequency at which the reactance of the condenser is numerically equal to $R$ for all frequencies well below $f_c$ the above expression reduces substantially to $$\frac{f^2}{f_c^2}$$

The circuit therefore has an insertion loss ratio with a positive slope of 6 decibels per octave.

The attenuation pad 7 may be of any of the forms well known in the art. Its insertion loss must be constant with frequency and must be such that the power from circuit 8 at any frequency $f$ is $f^2$ times the power from circuit 7 at the same frequency, in order to conform to Equation 5. This requires that the power ratio corresponding to the insertion loss of 7 be $$\frac{1}{f_c^2}$$

It will be apparent to those skilled in the art that relative weighting of the noise components $$\int_0^{f_1} nd(f) \text{ and } \int_0^{f_1} f^2nd(f)$$

such as produced by the attentuating and pre-emphasis circuits 7 and 8 described in the foregoing paragraphs, could be provided by circuit components of an entirely different description, such as, for example, a pair of amplifiers, one of which has a uniform gain characteristic, and the other of which has a gain frequency characteristic having a uniform positive slope of 6 decibels/octave. Thus, it can be said in general that the relative weighting of the aforesaid noise components can be carried out by any two circuits, one of which has a uniform transmission equivalent for all frequencies over the frequency band of interest, and the other of which has a transmission equivalent having a uniform positive slope of 6 decibels/octave over the said frequency band.

Operation of the circuit of Fig. 2 for the measurement of the effective noise of a test television circuit will now be described.

When the switches 5 and 6 are thrown upward contacting the terminals 5*a* and 6*a*, the noise from the test television circuit passes through the uniformly attenuating resistance pad 7, the adjustable attenuator 4 and the amplifier 1 to the power meter P, including the square law detector 2. The output of the detector 2 passes to the three-scaled direct-current meter 3. As described hereinbefore, the middle scale A is calibrated to permit reading the absolute noise power in decibels with respect to some reference power which is determined by the value of the resistance pad 4 and the gain of amplifier 1. The reading on the upper scale B, which for given input energy is $^3/_2$ times the reading on the decibel scale A, corresponds to the first term on the right-hand side of Equation 6.

When the switches 5 and 6 are thrown downward to positions 5b and 6b, the noise passes through the pre-emphasis or differentiating circuit 8 which, as described hereinbefore, functions to modify the noise spectrum by 6 decibels per octave over the frequency range of interest. The modified noise spectrum is impressed through the uniform attenuator 4 on the amplifier 1, the detector 2, and the direct-current power meter 3 in the same manner described in the foregoing paragraph with reference to the output of the attenuator 5. The power meter 3 is, in this case, read on the third scale C, the reading being ½ times the energy indicated on the decibel scale A. This reading corresponds to the second right-hand term of Equation 5.

The effective noise in decibels with respect to some reference value which, as noted above, is determined by the size of the attenuating pad, the amplifier gain and the constants of the detector and the power meter, is the difference between the reading on the 3/2 scale B with the switches 5 and 6 in the upper positions and the reading on the ½ scale C with the switches in the lower positions.

Now suppose the television circuit consists of two sections which are to be ultimately connected together; and that the noise on each section is measured. It is desired to determine from these measurements the effective noise which will ultimately be produced at the end of the entire circuit. Let the spectra of the noise in the separate sections be $n_1$ and $n_2$, respectively. The spectrum of the over-all noise will be simply the sum of these of $(n_1+n_2)$. Therefore, $$N=\int_0^{f_1}(n_1+n_2)df=N_1+N_2 \qquad (7)$$

That is, the noise power at the end of the circuit is equal to the sum of the noise powers on the separate sections. This assumes, of course, that the measurements are all made at equal energy level points. Also, $$I=\int_0^{f_1}(n_1+n_2)f^2d(f)=I_1+I_2 \qquad (8)$$

Thus the value of I for the over-all noise is obtained by adding the values of I for the separate sections.

Therefore, the procedure is to read the values of N and I for the separate sections as powers on scale A, which may be calibrated in microwatts in addition to decibels. The values of N are added, and the point on scale B corresponding to the position of the sum on scale A is noted. Similarly, the values of I are added, and the point on scale C corresponding to the position of the sum on scale A is noted. The difference between the figure from scale B and the figure from scale C gives the value of the effective over-all noise. If the noise on the separate sections was originally measured in terms of N and $N_e$, use can be made of the following equation, derived from (6)

$$I(db)=3N(db)-2N_e(db) \qquad (9)$$

to determine the values of I.

What is claimed is:

1. A circuit for measuring the effective noise of a television circuit which comprises in combination a first network having a uniform attenuation characteristic over a selected frequency band, a second network having an attenuation characteristic which over said frequency band has a uniform positive slope of 6 decibels/octave, a square-law detecting circuit, means to connect said first and said second networks alternatively in energy transfer relation between said television circuit and said square-law detecting circuit, a direct current meter connected to receive output energy from said detecting circuit, said meter having an indicator which moves simultaneously over a pair of calibration scales, one of said scales calibrated to read the output energy of said meter in terms of 3/2 decibels, and the other of said scales calibrated to read the output current in terms of ½ decibel.

2. A circuit for measuring the effective noise in a television circuit in accordance with the formula $N_e$, the effective noise power in decibels, equals 3/2N, the actual noise power in decibels, minus ½I, the moment of inertia of the noise frequency spectrum in decibels, which comprises in combination a direct current power indicating circuit having a plurality of scales, one of said scales calibrated in units equal to 3/2 decibels, another of said scales calibrated in units equal to ½ decibel, an indicator movable over said scales in response to direct current received in said indicating circuit, a first attenuator having a flat attenuation characteristic for all frequencies over the frequency range of said noise, a second attenuator having a frequency attenuation characteristic which has a uniform positive slope of 6 decibels/octave over said frequency range, and switching means for alternatively connecting said first attenuator or said second attenuator in energy transfer relation between said television circuit and said power indicator, whereby power readings are respectively obtained on said 3/2 decibel scale and on said ½ decibel scale and subtracted to obtain the effective noise in decibels in accordance with the aforesaid formula.

3. A circuit for measuring the effective noise in a television circuit in accordance with the formula $N_e$, the effective noise power in decibels, equals 3/2N, the actual noise power in decibels, minus ½I, the moment of inertia of the noise frequency spectrum in decibels, which comprises in combination a direct current power indicating circuit having a plurality of scales, one of said scales calibrated in units equal to 3/2 decibels, another of said scales calibrated in units equal to ½ decibel, an indicator movable over said scales in response to energy received in said indicating circuit, a first circuit having a uniform transmission equivalent for all frequencies over the frequency range of said noise, a second circuit having a transmission equivalent which varies uniformly with frequency at a positive slope of 6 decibels/octave over said frequency range, and switching means for alternatively connecting said first circuit and said second circuit in energy transfer relation between said television circuit and said power indicator, whereby power readings are respectively obtained on said 3/2-decibel scale and on said ½-decibel scale and subtracted to obtain the effective noise in decibels in accordance with the aforesaid formula.

4. A circuit for measuring noise components in a television circuit which comprises in combination means connected to said television circuit to receive the integrated random noise from said television circuit, a first transmission path having a transmission equivalent which is substantially uniform for all frequencies over the frequency range of said noise, a second transmission path having a transmission equivalent which varies uniformly at 6 decibels/octave over the frequency range of said random noise, and measuring means for measuring the output energy of said first transmission path in terms of 3/2 decibels and for measuring the output energy of said second transmission path in terms of ½ decibel.

5. A circuit for measuring noise components in a television circuit which comprises in combination means connected to said television circuit to receive the integrated random noise from said television circuit, a first transmission path having a transmission equivalent which is substantially uniform for all frequencies over the frequency range of said noise, a second transmission path having a transmission equivalent which varies uniformly at a positive slope of 6 decibels/octave over the frequency range of said random noise and means for receiving and measuring the output energies from said paths.

6. A circuit for measuring noise components in a television circuit which comprises in combination means connected to said television circuit to receive the integrated random noise from said television circuit, a first transmission path having a transmission equivalent which is substantially uniform for all frequencies over the frequency range of said noise, a second transmission path having a transmission equivalent in decibels which varies substantialy as the square of the frequency over the frequency range of said random noise, and means for receiving and measuring the output power from said paths.

7. The method of measuring noise components in a television circuit which comprises receiving the integrated random noise power of said circuit, uniformly attenuating a first component of said integrated random noise over said frequency range, detecting and squaring the output of said uniformly attenuated component, measuring the said output of said uniformly attenuated component in terms of 3/2 decibels, non-uniformly attenuating a second component of said integrated random noise in accordance with an attenuation characteristic having a uniform slope of 6 decibels/octave over said frequency range, detecting and squaring the direct-current component of said non-uniformly attenuated component, and measuring the said output of said non-uniformly attenuated component in terms of ½ decibel.

8. The method of measuring noise components in a television circuit which comprises receiving the integrated random noise power from said circuit, transmitting a first component of said integrated random noise power over a transmission path having a transmission equivalent which is substantially uniform for all frequencies over the frequency range of said noise, transmitting a second component of said random noise power over a transmission path having a transmission equivalent which has a uniform variation of 6 decibels/octave over the frequency range of said noise, measuring the output energy of said first path in terms of 3/2 decibels, and measuring the output energy of said second path in terms of ½ decibel.

9. The method of measuring noise components in a television circuit which comprises receiving the integrated random noise from said circuit, transmitting a first component of said integrated random noise over a transmission path having a transmisstion equivalent which is substantially uniform for all frequencies over the frequency range of said random noise, transmitting a second component of said random noise over a transmission path having a transmission equivalent which varies uniformly as 6 decibels/octave over the frequency range of said random noise, and measuring the output energies in said respective transmission paths.

10. The method of measuring noise components in a television circuit which comprises receiving the integrated random noise from said circuit, transmitting a first component of said integrated random noise over a transmission path having a transmission equivalent which is substantially uniform for all frequencies over the frequency range of said random noise, transmitting a second component of said random noise over a transmission path having a transmission equivalent in decibels which varies substantially as the square of the frequency over the frequency range of said random noise, and receiving and measuring the output power from said paths.

11. The method of measuring noise components for computing the effective noise in a television circuit which comprises integrating the random noise power over a given band of frequencies, and weighting the said integrated random noise power in accordance with the frequency radius of gyration of the said noise power distribution.

DANFORTH K. GANNETT.

REFERENCES CITED

The following references are of record in the file of this patent:

UNITED STATES PATENTS

| Number | Name | Date |
|---|---|---|
| 2,411,553 | Ramo | Nov. 26, 1946 |
| 2,498,676 | Grieg | Feb. 28, 1950 |